United States Patent [19]

Kaivanto

[11] Patent Number: 4,686,748

[45] Date of Patent: Aug. 18, 1987

[54] ATTACHMENT DEVICE

[76] Inventor: Pekka J. Kaivanto, 32 - 1702 Newton Avenue, Victoria, British Columbia, Canada, V8R 2R2

[21] Appl. No.: 868,963

[22] Filed: May 30, 1986

[51] Int. Cl.$^4$ .............................................. B42F 1/00
[52] U.S. Cl. .......................................... 24/522; 24/460
[58] Field of Search ...................... 24/522, 459, 136 R, 24/526, 487, 460, 461, 462, 498, 265 R, DIG. 11; 90 C, 490, 491, 492, 469; 135/115, 118; 160/348, 390

[56] References Cited

U.S. PATENT DOCUMENTS

| 808,653 | 1/1906 | Hall et al. | 24/460 |
| 1,218,769 | 3/1917 | Hill | 24/90 C |
| 1,555,322 | 9/1925 | Kleinhesselink | 135/118 |
| 1,834,084 | 12/1931 | Barnes | 135/118 |
| 1,975,000 | 9/1934 | Beaumont et al. | 24/460 |
| 2,063,429 | 12/1936 | Gordon | 24/90 C |
| 2,074,928 | 3/1937 | Miller | 160/348 |
| 2,089,221 | 8/1937 | Patur et al. | 24/460 |
| 2,125,540 | 8/1938 | Carlson | 24/90 C |
| 2,647,718 | 8/1953 | Disera | 135/118 |
| 2,837,804 | 6/1958 | Danell | 24/522 |
| 2,893,068 | 7/1959 | Johnson et al. | 24/DIG. 11 |
| 2,920,407 | 1/1960 | Stathem | 24/526 |
| 3,162,920 | 12/1964 | Durham | 24/DIG. 11 |
| 3,225,408 | 12/1965 | Durham | 135/115 |
| 3,715,782 | 2/1973 | Newell | 24/129 R |
| 3,785,003 | 1/1974 | Thomson | 24/462 |
| 4,536,924 | 8/1985 | Willoughby | 24/487 |

FOREIGN PATENT DOCUMENTS 32970 11/1964 German Democratic Rep. ... 24/460

Primary Examiner—Victor N. Sakran
Attorney, Agent, or Firm—Townsend and Townsend

[57] ABSTRACT

A clamp to attach to a flexible sheet. The clamp has a first member with sides narrowing longitudinally to a first end and inclining upwardly inwardly. The first member can receive an attachment. A second member comprises a main body formed with a recess that narrows longitudinally to a first end and with interior sides that incline upwardly inwardly. Thus the first member can be received within the second member with the flexible sheet clamped between.

6 Claims, 5 Drawing Figures

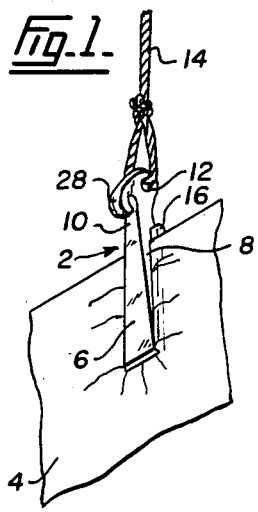
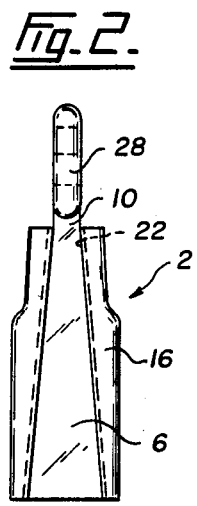
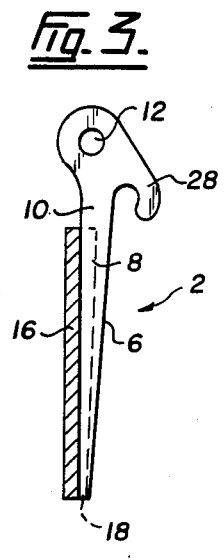
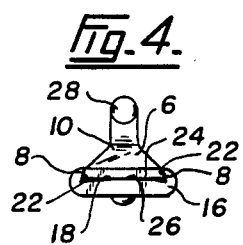
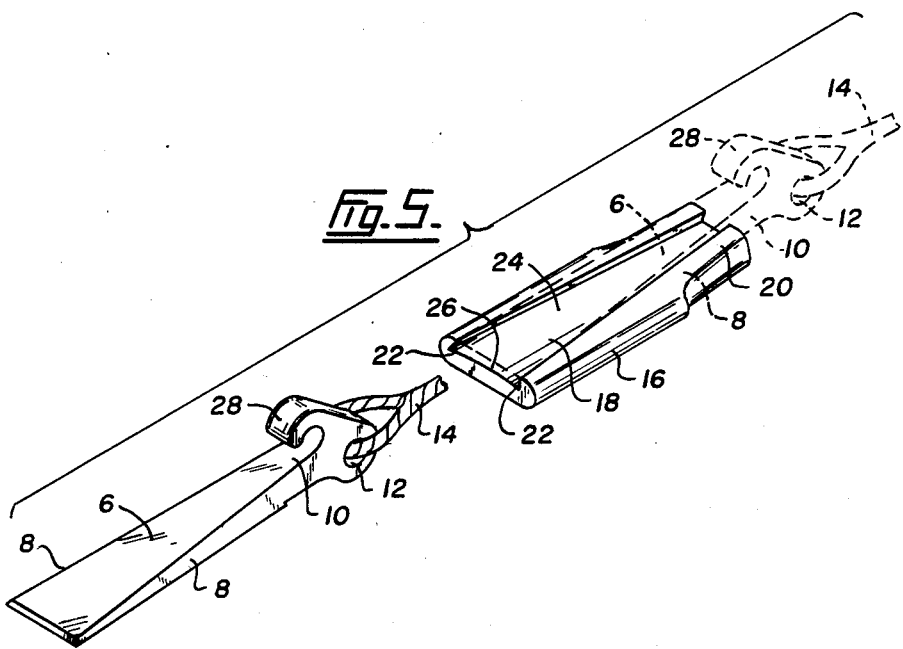

ATTACHMENT DEVICE

FIELD OF THE INVENTION

This invention relates to a clamp, more particularly to a clamp adapted to attach to a flexible sheet.

DESCRIPTION OF THE PRIOR ART

Clamps that can attach to flexible sheets of a variety of materials are well known. They find particular application in the positioning of protective sheets, particularly waterproof sheets, over items as diverse as lumber and cars. In probably the most common means of locating such sheets they are simply provided with reinforced edges and with grommets, often of metal, formed in openings in the reinforced edges. A rope can then be run through the openings to locate the sheet over the load.

The above system has a number of disadvantages. First the attachment is restricted. The openings are in a pre-arranged pattern and ropes can only be attached at those particular positions. Furthermore if a grommet tears out, as happens, the location of the device can become inadequate. The sheet can flop around, for example in the wind, and further damage be done.

A number of attempts have been made to cure this deficiency by providing clamps and clips that can be attached to a flexible sheet at positions required for the particular circumstances. Examples of prior art known to applicant include U.S. Pat. Nos. 3,225,408 to Durham; 3,715,782 to Park; 3,162,920 to Durham; 3,052,536 to Margulis; 2,893,068 to Johnson and 4,536,924 to Willoughby.

However it is not believed that the above patents offer the complete freedom of use that is desirable. Several of the above patents require the use of adhesives which means that the device can only be used once or, at least, will deteriorate fairly rapidly with removal and reuse.

SUMMARY OF THE INVENTION

The present invention provides a clamp useful on a wide variety of flexible sheets, from relatively thick tarpaulins to polyethylene sheet of only several thousandths of an inch thick, at any location on the sheet.

Accordingly the present invention is a clamp to attach to a flexible sheet, the clamp comprising a first member with sides narrowing longitudinally to a first end and inclining upwardly inwardly; means at the first end of the first member to receive attachment means; a second member comprising a main body formed with a recess that narrows longitudinally to a first end and with interior edges that incline upwardly inwardly; whereby the first member can be received within the second member with the flexible sheet clamped between. To enhance the clamping action of the device, the means for receiving the attachment means is offset from a longitudinal axis of the clamp for creating a torque which causes the second member to press tightly against the sides of the first member.

DRAWINGS

Aspects of the invention are illustrated, merely by way of example, in the accompanying drawings in which:

FIG. 1 is a general view showing the clamp of the present invention attached to a flexible sheet;

FIG. 2 is a plan view of the clamp according to the present invention;

FIG. 3 is a side elevation, in section, of the clamp of FIG. 2;

FIG. 4 is an end elevation of the clamp of FIG. 2; and

FIG. 5 is an exploded view of the clamp of FIG. 2.

DESCRIPTION OF THE PREFERRED EMBODIMENTS

The drawings show a clamp 2 to attach to a flexible sheet 4. The clamp comprises a first member 6 with sides 8, including outer surface 5 and inner surface 7. Outer surface 5 forms an angle 9 with inner surface 7, and angle 9 is bisected by a longitudinal axis 11. The sides 8 narrow longitudinally to a first end 10 and simultaneously incline upwardly inwardly, as shown particularly in FIGS. 4 and 5. There is an opening 12 at the narrow end of the body to receive attachment means, a rope 14 is shown in FIGS. 1 and 5.

The clamp 2 includes a second member 16 comprising a main body formed with a recess 18 that narrows longitudinally to a first end 20. The interior sides 22 of the recess 18 incline upwardly inwardly, as shown most clearly in FIG. 4. Further base 24 of the recess 18 is inclined upwardly to its middle at 26.

This arrangement of the sides of the first member 6 and of the second member 16 inclining upwardly inwardly means that the first member 6 can be received within the second member 16 as a slide fit. The center of opening 12 is offset from longitudinal axis 11, toward second member 16 in this embodiment, for reasons discussed later. The separated position is shown in FIG. 5 in solid lines. The first member is shown in broken lines in its engaged position in FIG. 5.

In the preferred embodiment illustrated the first member desirably includes a hook 28 so that a further rope (not shown) can be attached to neighbouring clamps to stabilize the position of the clamps.

As shown particularly in FIGS. 3 and 5 it is desirable that the first member 6 thickens longitudinally towards the narrow end 10 to provide strength.

The clamps of the present invention are used as follows. To attach the clamp to any position on a flexible sheet 4 the second member 16 is placed against the sheet 4 and the first member 6 then brought towards the second member 16 on the opposite side of the sheet 4. The first member 6 will be such that the first end 10, that is the narrower end, can slide into a relatively wide part of the recess 18 in the second member 16. The two parts 6 and 16 are pushed together through the flexible sheet 4 and the first member 6 then slid in the direction of its narrow end to engage it in the recess 18 in the second member 16. The useful position is shown in FIG. 1.

A rope 14 may then be attached through the openings 12 and the clamp 2, and thus the flexible sheet 4, located in conventional manner. If necessary a further rope can be led through the hooks 28 to restrict further relative movement of the neighbouring clamps. Because opening 12 is offset from longitudinal axis 22, the force created by rope 14 will lie in a plane separate from the opposing force created by sheet 4. As a result, a torque (counterclockwise in the arrangement shown in FIG. 1) is created, causing first member 6 to be biased against sides 22 of second member 16. This enhances the clamping action of clamp 2.

The clamps may be made of plastic or of metal. Generally speaking they will be made so that clearance is provided to permit free movement of the second member 6 in the first member 16 through a sheet 4 varying in thickness from the thin polyethylene sheet commercially available to relatively thick tarpaulins.

The clamp finds application in the hanging of drapes, the covering of lumber in lumber yards and construction, the covering of loads in trucking, the covering of crops, for example hay, in farming, in the formation of tents and temporary shelters, as clothes pegs, in boat and car covers, for temporary sail repairs in boating, for the location of awnings and, indeed, in any other of the large number of applications where a flexible sheet is required to be located.

I claim:

1. A clamp to attach to a flexible sheet, the clamp comprising:

a first member with sides narrowing longitudinally to a first end and inclining upwardly inwardly;

means at the first end of the first member to receive attachment means;

a second member comprising a main body formed with a recess that narrows longitudinally to a first end and with interior sides that incline upwardly inwardly, the recess having a base that inclines upwardly from each side to its middle;

whereby the first member can be received within the second member with the flexible sheet clamped between.

2. A clamp as claimed in claim 1 in which the means at the first end of the first member to receive attachment means comprises an opening.

3. A clamp as claimed in claim 1 in which the first member includes a hook to allow attachment of the clamp to other clamps.

4. A clamp as claimed in claim 1 in which the first member thickens longitudinally towards the first end to provide strength.

5. A clamp according to claim 2 wherein the first member has an inner surface for abutting the base of the recess of the second member and an outer surface opposite the inner surface which forms an angle with the inner surface, and wherein the center of the opening is offset from a longitudinal axis bisecting the angle.

6. A clamp according to claim 6 wherein the center of the opening is disposed between the inner surface and the longitudinal axis.

* * * * *